(12) United States Patent
Neglur et al.

(10) Patent No.: US 9,229,526 B1
(45) Date of Patent: Jan. 5, 2016

(54) DEDICATED IMAGE PROCESSOR

(75) Inventors: Smita Neglur, Santa Clara, CA (US);
Leo B. Baldwin, San Jose, CA (US);
Aleksandar Pance, Saratoga, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 578 days.

(21) Appl. No.: 13/608,575

(22) Filed: Sep. 10, 2012

(51) Int. Cl.
*G06F 3/00* (2006.01)
*G06F 15/76* (2006.01)
*H04N 13/00* (2006.01)

(52) U.S. Cl.
CPC .... *G06F 3/00* (2013.01); *G06F 15/76* (2013.01); *H04N 13/0059* (2013.01)

(58) Field of Classification Search
CPC .............. H40N 13/0239; G06F 2015/763; G06F 2217/64; G06F 3/00; G06F 2209/509; G06F 9/223; G06F 9/3851
USPC .............. 348/47, 49, 222.1, 571; 345/503; 455/574; 712/232, 220; 713/300, 323
See application file for complete search history.

(56) References Cited

U.S. PATENT DOCUMENTS

| | | | | |
|---|---|---|---|---|
| 7,038,687 B2 * | 5/2006 | Booth, Jr. | ............ | G06F 9/3879 345/503 |
| 7,399,952 B2 * | 7/2008 | Kinoshita | ................. | 250/214 R |
| 7,457,907 B2 * | 11/2008 | Takahashi et al. | ............ | 711/103 |
| 7,729,548 B2 * | 6/2010 | Lea et al. | ...................... | 382/234 |
| 8,284,205 B2 * | 10/2012 | Miller et al. | .................. | 345/502 |
| 8,427,430 B2 * | 4/2013 | Lee et al. | ...................... | 345/169 |
| 8,427,485 B2 * | 4/2013 | Shinomiya | ..................... | 345/501 |
| 8,477,613 B2 * | 7/2013 | Karunakaran et al. | ...... | 370/230.1 |
| 8,576,293 B2 * | 11/2013 | Bhrugumalla et al. | .... | 348/218.1 |
| 8,638,790 B2 * | 1/2014 | Mir et al. | ..................... | 370/392 |
| 8,706,172 B2 * | 4/2014 | Priyantha et al. | ............. | 455/574 |
| 2007/0198981 A1 * | 8/2007 | Jacobs et al. | ................ | 718/102 |
| 2008/0180540 A1 * | 7/2008 | Kim et al. | .................. | 348/222.1 |
| 2009/0259854 A1 * | 10/2009 | Cox et al. | ...................... | 713/189 |
| 2009/0270138 A1 * | 10/2009 | Raveendran | ................. | 455/574 |
| 2010/0220215 A1 * | 9/2010 | Rubinstein et al. | ...... | 348/231.99 |
| 2011/0149116 A1 * | 6/2011 | Kim | ....................... | 348/231.99 |
| 2011/0242356 A1 * | 10/2011 | Aleksic | ............... | H04N 5/2258 348/222.1 |
| 2011/0285866 A1 * | 11/2011 | Bhrugumalla et al. | .... | 348/218.1 |
| 2011/0292178 A1 * | 12/2011 | Goma et al. | ..................... | 348/46 |
| 2011/0316981 A1 * | 12/2011 | Iwabuchi | .............. | G06T 7/0069 348/49 |
| 2012/0081519 A1 * | 4/2012 | Goma et al. | ................... | 348/47 |

OTHER PUBLICATIONS

Havinga et al., Energy Management for Dynamically Reconfigurable Heterogeneous Mobile Systems, 2001, IEEE, 1-13.*

* cited by examiner

*Primary Examiner* — Christopher S Kelley
*Assistant Examiner* — Kathleen Walsh
(74) *Attorney, Agent, or Firm* — Novak Druce Connnolly Bove + Quigg LLP (57) ABSTRACT

A dedicated application-specific integrated circuit (ASIC) is described that can be integrated into a mobile device (e.g., a mobile phone, tablet computer). The dedicated ASIC can provide an embedded low-power micro-controller to offload machine vision processing and other image processing from an application processor (AP) of the mobile device. Effectively, the offloading of image processing can enable the mobile device to save battery life and improve performance by utilizing lower speed buses and lower power consumption than would otherwise be consumed if the AP were to be utilized. In various embodiments, the ASIC can be used to either connect a single camera or multiple synchronized cameras depending on the application.

20 Claims, 8 Drawing Sheets

DEDICATED IMAGE PROCESSOR

BACKGROUND

Digital cameras and photography have become an important part of everyday life for countless people. Digital cameras are being included in more and more devices and the quality of the images they capture is improving at a rapid pace. Aside from dedicated cameras, devices such as personal computers (PCs), mobile phones, tablet computers, laptops and electronic goggles are often equipped with some sort of image capturing apparatus. All of this technological integration presents ever more opportunities for utilizing imaging data for a variety of different purposes.

One interesting area of technology that has benefited significantly from digital cameras has been in the field of portable devices, such as tablet computers and mobile phones. Many phones and tablets today have multiple cameras integrated therein (e.g., a front-facing camera and a rear-facing camera). These cameras can provide a large amount of imaging data and therefore present significant opportunities for performing image analysis and other computations. However, a number of limitations and concerns still exist for such mobile devices. For example, in recent years, many users have viewed the battery life of a mobile device as being poor. This has been due in part on the large number of features and components that have been integrated into the portable device. Accordingly, manufacturers have been looking to improve the battery life of their mobile devices.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for performing image and/or machine vision processing. In particular, various embodiments provide approaches for enabling one or more dedicated components, such as at least one application-specific integrated circuit (ASIC), that can be integrated into a computing device such as a mobile device (e.g., a mobile phone, tablet computer). A component such as a dedicated. ASIC can provide an embedded low-power micro-controller to offload machine vision processing and other types of image processing from an application processor (AP) of the mobile device. Effectively, this offloading can enable the mobile device to save battery life and improve performance by utilizing lower speed buses and lower power consumption than would otherwise be consumed if the AP were to be utilized. In various embodiments, the ASIC can be used to either connect a single camera or multiple synchronized cameras depending on the application.

In accordance with various embodiments, a dedicated ASIC can enable the offloading of basic image signal processing, as well as higher level or "machine vision" processing from the application processor of the mobile device. The application processor can be any system on a chip (SoC) designed to support applications running in a mobile computing environment, such as on a mobile phone, tablet computer or electronic reader (e-reader) device. In one embodiment, the application processor is the processor that executes the operating system (OS) and the applications on a mobile computing device.

In various embodiments, the ASIC can include an images signal processor (ISP) that performs low-level image signal correction, and a digital signal processor (DSP) that performs high-level machine vision processing. Image signal correction performed by the ISP can include actions such as dead pixel correction, lens correction, geometric correction, data compression, generating a histogram of the pixel information, automatic exposure control, automatic gain control, automatic white balance, de-mosaicing, smoothing, edge enhancement, blob identification, image thresholding, and various other processing. For example, dead pixel correction can refer to any process executed by a processor to correct defective, stuck, dead or otherwise malfunctioning pixels on a liquid crystal display (LCD). Lens correction can include any process to correct flaws caused by camera lens distortion, such as barrel or pincushion distortion, chromatic aberration and the like. Geometric correction can refer to any process for manipulating image data to make the image's projection match a specific projection surface or shape. A histogram of an image can be any representation of pixel intensity values of the image. Demosaicing can refer to any process that can be used to reconstruct an image from incomplete samples. Blob identification can refer to any process that can be used to identify distinct shapes in an image without actually determining what those shapes are. Image thresholding can be any process used to mark individual pixels in an image as object pixels if their value is greater than a threshold value (e.g., assuming an object to be brighter than the background) and as background pixels otherwise.

In accordance with an embodiment, the dedicated ASIC also includes a microprocessor (MP) or digital signal processor (DSP) that performs some of the higher level machine vision processing, such as gesture tracking, head/face tracking, object tracking, face/object recognition, multiple image stereo processing (e.g. image rectification, generating stereo disparity maps), three dimensional image capture, metadata tagging of the image data (e.g., geo-tagging, time-stamping), symbol reading (e.g., barcodes, 2D ID codes), optical character recognition (OCR) and the like. As used herein, machine vision processing can include any process that can be used to analyze an image and extract, deduce or learn information about that image. For example, a dedicated ASIC can process image data to determine when a user has made a particular hand gesture (e.g., gesture tracking), detect when a specific face is recognized (e.g., face recognition), identify that a barcode has been read and provide the value of the barcode (e.g., symbol reading), or determine other information that can be provided to the AP and be used to control the user interface of the device.

In conventional hardware implementations, most image-based computations and analyses would need to be performed by providing all of the image data from the camera to the AP over high-speed and high power consuming image buses and processing the image data at the AP. Rather than utilizing these power-costly processes, a dedicated ASIC can instead perform the majority of the processing locally and only provide the extracted higher level information (e.g., machine vision information) to the AP over a low-speed and low consumption bus (e.g., I²C). For example, the ASIC can inform the AP whenever it detects that a gesture has been made, or whenever a facial recognition has been detected. In some embodiments, the ASIC can interrupt or "wake up" the AP that is in a standby mode (e.g., "sleep" mode) upon detecting that a specific type of machine vision information has been detected. This can significantly reduce the battery power consumption, as the AP can remain in standby mode and does not need to continuously obtain all of the image data captured by the cameras and process it. At the same time, if the AP determines that further processing of the image data does need to be performed based on the received machine vision information, it can initiate the transfer of the image data from the ASIC to the AP over a high-speed dedicated image bus (e.g., MIPI interface). For example, the AP can continuously inspect the high level information being received over the low-power and low-speed bus from the dedicated. ASIC, determine that the image data may be of interest for additional processing based on the received information, and turn on the high speed image bus to transfer the bulk of the image data to the AP as needed. In this manner, by turning off the high speed bus for the majority of the time, a substantial power savings can be obtained on the mobile device.

In accordance with an embodiment, an ASIC includes a local memory that is capable of storing one or more images received from the camera. This can enable the ASIC to locally process the one or more images without reading/writing the data from the main memory of the device. In some embodiments, the ASIC can also have an interface to the main memory of the device, to which it can write/read the data if that is deemed necessary.

In some embodiments, an ASIC can be integrated into a mobile computing device (e.g., mobile phone) that has a plurality of cameras integrated therein, and the ASIC can serve as an image sensor fusion hub for the cameras. The multiple cameras can be independently controlled cameras that have different frame rates and/or different resolutions. Some of these cameras may be high resolution cameras; some may be medium resolution and yet other cameras may be low resolution cameras. For example, the standard rear-facing digital camera used by a user to snap a photograph may be a high resolution camera, while other cameras (e.g. front-facing cameras used for gesture detection) may be of lower resolution. The dedicated image processing ASIC can be connected to some or all of these cameras by way of a combiner that receives the image data from the cameras over buses capable of carrying image data (e.g., MIPI, SPI, I²C). The ASIC can process all of the information coming from the multiple cameras such that the AP does not need to be woken up or invoked unless a specified event of interest occurs (e.g., a gesture is detected by the ASIC, a face is recognized, etc.). In some embodiments, two or more of the cameras may be configured as stereo pairs and provide the image data to the ASIC for stereo processing. The dedicated ASIC can enable rectification of the images and generate disparity maps for stereo processing and the like.

As used throughout this disclosure, the terms "machine vision information" and "high level information" or "control information" are often used interchangeably and are intended to cover any information or data that can be extracted, derived or computed based at least in part on the raw image data received from the one or more cameras to the dedicated ASIC. By way of some illustrative examples, the machine vision information might include user hand gesture information, facial or object recognition information, head tracking information or other information which was computed based at least in part on one or more images and which can be used to control a user interface of the device. As another example, the machine vision information may include information (e.g., disparity map) obtained from stereo processing two or more images obtained from cameras that may be configured to function as stereo pairs.

Figure 1:
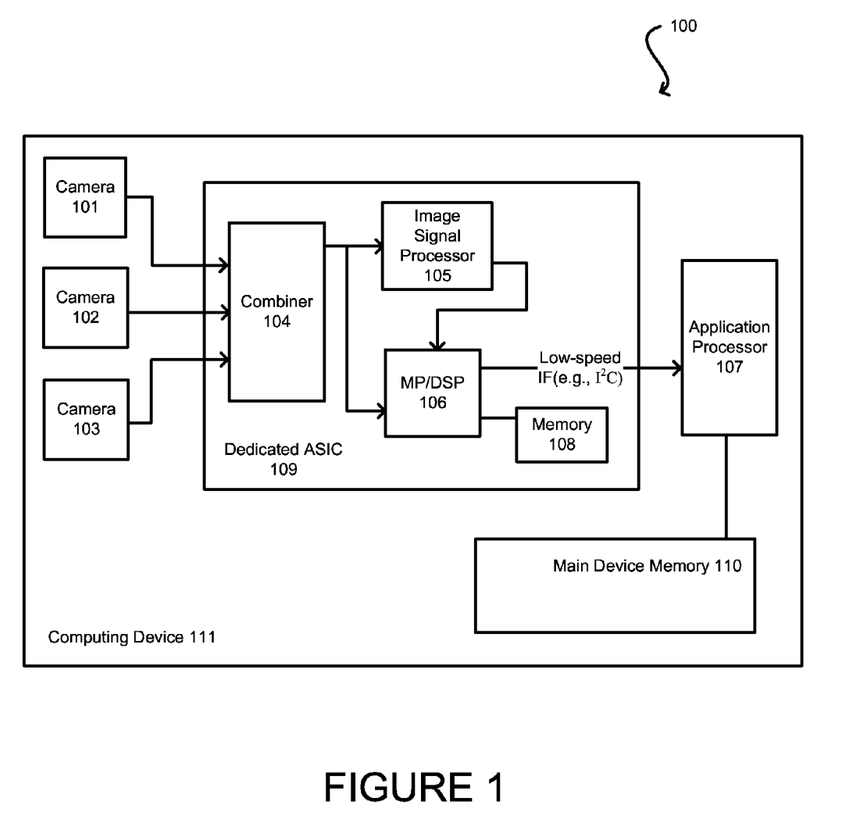
FIG. 1 illustrates an example structure of a dedicated application-specific integrated circuit (ASIC) embedded into a computing device, in accordance with various embodiments.

FIG. 1 illustrates an example 100 structure of a dedicated ASIC 109 embedded into a computing device 111, in accordance with various embodiments. In the illustrated embodiment, the dedicated ASIC 109 includes a combiner 104 having connections to a plurality of cameras (101, 102, 103) of the computing device 111, a local memory 108 capable of storing at least a frame's (e.g., image) worth of data, an image signal processor (ISP) 105 for performing various correction and de-mosaicing of the image data, and a microprocessor (MP) or digital signal processor (DSP) 106 that is capable of performing machine vision processing of the image data.

In various embodiments, the cameras (101, 102, 103) can be any type of camera that can be integrated into a computing device 111. For example, the cameras connected to the ASIC may be high resolution, medium resolution, or low resolution cameras. Some or all of the cameras may have special modes (e.g., global shuttering, rolling shuttering). Some of the cameras may be monochrome while others may be full color. Some of the cameras may be configured as stereo pairs, while others may function independently of each other. Some cameras may have different frame rates from other cameras. In accordance with an embodiment, all of these cameras feed into the dedicated ASIC by way of a combiner component, as previously described. In some embodiments, the combiner 104 can sequentially receive one of the incoming signals and provide the selected input to the recipient component (e.g., ISP or DSP). In other embodiments, the combiner 104 can simultaneously provide both signals to the receiving component, combine the signals and/or the like. In other embodiments, the combiner is capable of both (1) switching between the multiple signals; and (2) combining multiple signals into one resulting signal that is provided to the ASIC. It should be noted that although the illustration shows three cameras (101, 102, 103) connected to the dedicated ASIC, the number of cameras should not be perceived as a limitation to all the various embodiments contemplated herein and that in alternative embodiments, the ASIC can connect to any number of cameras, including a single camera.

In accordance with an embodiment, the cameras (101, 102, 103) can be connected to the combiner 104 of the dedicated ASIC 109 by way of any link that is appropriate for sending image data. For example, the higher definition cameras can be connected using a Mobile Industry Processor Interface (MIPI) bus, while the lower resolution cameras may be connected by way of serial peripheral interface (SPI) or an Inter-Integrated Circuit ($I^2C$) bus. The interface between the dedicated ASIC 109 and the application processor (AP) 107, on the other hand, can be a lower power and low speed interface such as an $I^2C$ bus. The combiner can be any component that receives multiple digital or analog input signals (e.g., image data streams) and produces one or more output signals. The combiner makes it possible for multiple cameras (101, 102, 103) to share a single ASIC, or stated differently, it allows the ASIC to process image data received from some or all of the cameras of the device.

In accordance with an embodiment, the dedicated ASIC 109 analyzes the large amount of image data coming in from the cameras (101, 102, 103) and send only small packets of information to the AP 107 over the low-speed bus, containing high level information (e.g., machine level information) such as an indication that a particular gesture has been made, for example. This allows the image data to be processed locally at the dedicated ASIC and enables the AP to remain in standby mode or perform other functions, thereby alleviating the amount of power used by the AP. As illustrated, the dedicated ASIC 109 includes both an ISP 105 for performing correction and other low level image processing, and a MP/DSP 106 for performing higher level computations and data analysis on the image stream data received from the combiner 104. For example, the ISP 105 can perform bad pixel correction, relative illumination correction and de-mosaicing on the images received from the cameras. The DSP 106, on the other hand, may perform gesture detection and stereo disparity calculation on the images in the data stream. The disparity images can be compared to produce a three dimensional (3D) map.

In accordance with an embodiment, the dedicated ASIC 109 further includes a local memory 108 for storing some or all of the image stream data received from the cameras (101, 102, 103). This memory can be accessed by the DSP to read and/or write the images or the machine vision information. In addition, the computing device may comprise its own main memory 110 which is accessible by the application processor 107. As described herein, the term memory can encompass any physical device capable of storing data, such as flash memory, solid state drive (SSD), random access memory (RAM), disk based memory and the like.

Figure 2:
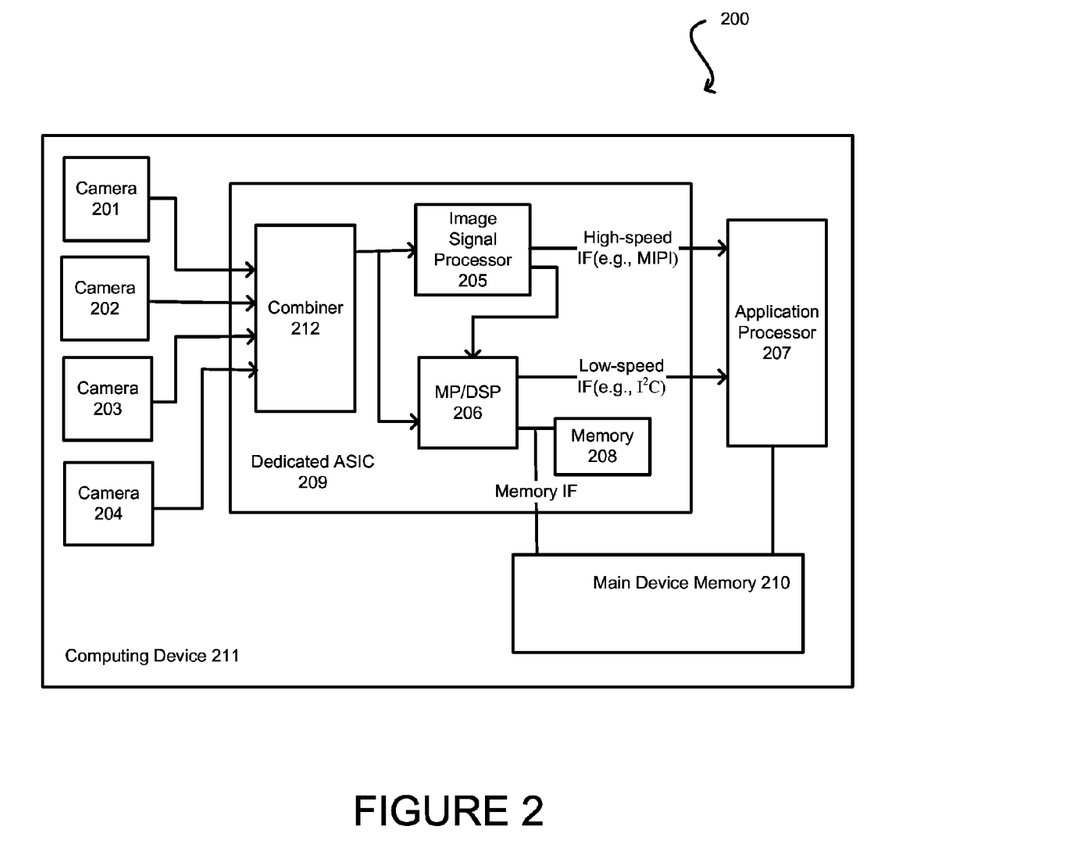
FIG. 2 illustrates an example of an alternative structure of the dedicated ASIC in the computing device, in accordance with various embodiments.

FIG. 2 illustrates an example 200 of an alternative structure of the dedicated ASIC in the computing device, in accordance with various embodiments. The structure depicted in this illustration is similar to the structure depicted in FIG. 1, with some notable differences. To begin with, the dedicated ASIC 209 contains a combiner 212 that is connected to four cameras (201, 202, 203, 204) instead of three. For example, camera 204 may be a rear-facing high resolution camera integrated into the mobile phone, camera 203 may be a front-facing medium resolution camera designed for optimizing face-to-face video communication over a network, and cameras (201, 202) may be low resolution front-facing cameras designed for sensing gestures and other user interface controls. In various embodiments, all of these cameras may be independently controlled, have different frame rates and so on.

In addition, the ISP 205 illustrated in FIG. 2 contains a high-speed interface (e.g., MPIP bus) directly to the application processor 207. This high-speed interface can allow the ISP 205 to provide the image data directly the AP 207. In some embodiments, the ISP can provide the image stream from certain cameras (e.g., rear-facing high resolution camera) directly to the AP so that it can be manipulated, stored in the main device memory 210 or otherwise processed by the AP 207. In other embodiments, the AP 207 may initiate the transfer of image data over from the ISP 205 over the high-speed bus if it determines that further processing is needed, as previously described. For example, the AP 207 may periodically receive high level machine vision information from the DSP 206 over the low speed bus (e.g., $I^2C$) and analyze the information according to various instructions (e.g., application, operating system, etc.). If the AP 207 determines that it needs the original image data to perform further computations on the data, the AP 207 can turn on the high-speed dedicated image bus to transfer the bulk of the image data from the ISP 205 to the AP 207. In this manner, the dedicated ASIC can analyze the images from a number of cameras and interpret the meanings of those images, all without turning on the AP 207 which may be power costly.

Furthermore, in contrast with the previous figure, FIG. 2 illustrates that the dedicated ASIC 209 includes a memory interface between the DSP 206 and the main device memory 210. This memory interface can be any interface, such as common flash memory interface (CFI) which enables the DSP 206 to read and/or write data to main memory 210. This allows the DSP 206 to write the image data and/or the high level machine vision information directly to memory, bypassing the need to provide the data to the AP first. This can provide improvements for certain applications and can further offload some processing from the application processor 207.

It should be noted that although the ASIC 109 of FIG. 1 and the ASIC 209 of FIG. 2 are illustrated as independent components, in alternative embodiments, these components can be integrated into other elements and structures. For example, the ASIC (e.g., 109, 209) can be integrated into a camera, another processor and the like.

Figure 3:
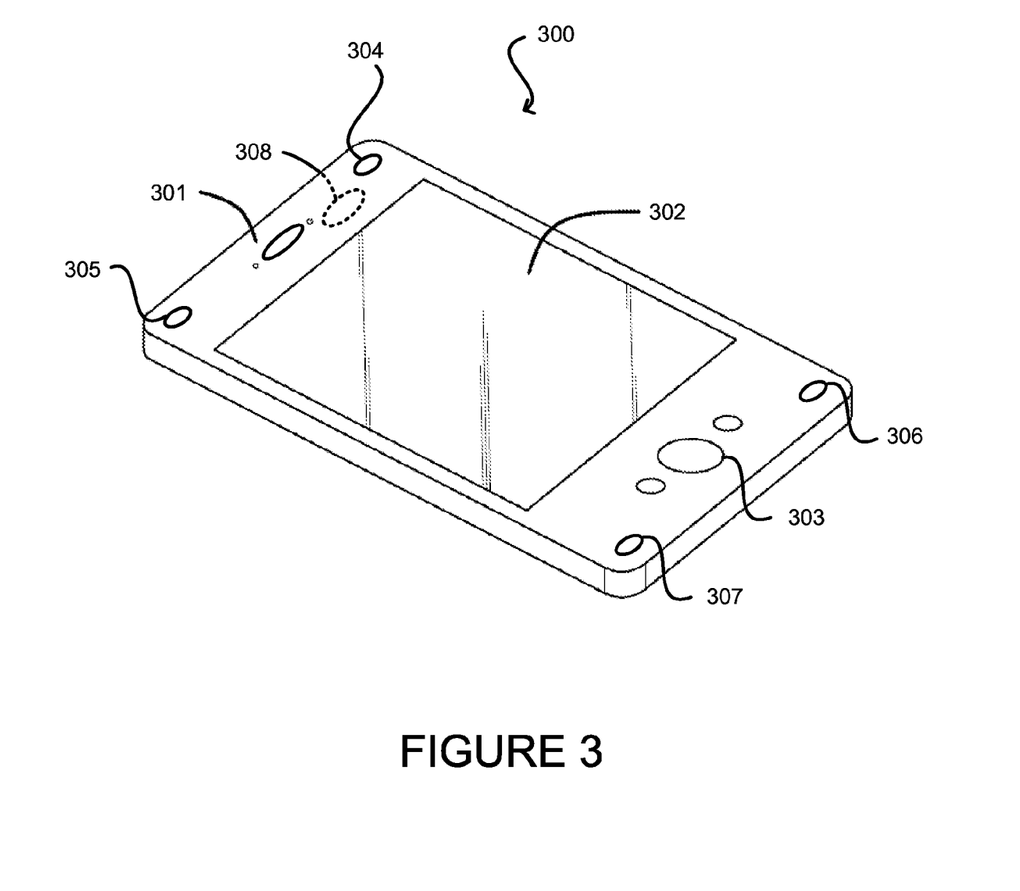
FIG. 3 illustrates an example of a mobile computing device that can have a dedicated image processor embedded therein, in accordance with various embodiments.

FIG. 3 illustrates an example of a mobile computing device 300 that can have a dedicated image processor embedded therein, in accordance with various embodiments. In the illustrated embodiment, the computing device 300 is a mobile phone (e.g., smartphone) having a touchscreen interface 302 for displaying information to the user and receiving input from the user. As used herein, the term "touchscreen" can include any component that is capable of detecting the presence and/or location of a touch within the display area of the mobile device, including but not limited to capacitive touchscreens, resistive touchscreens, infrared-based touchscreens, optical imaging based touchscreens and the like. In addition to the touchscreen, the computing device can include one or more buttons 303 that can also be used to receive input from the user of the device.

In accordance with the illustrated embodiment, the mobile computing device 300 further includes a front-facing camera 301, a rear-facing camera 308 and four corner cameras (304, 305, 306, 307). By way of illustration, the rear-facing camera 308 can be a high resolution digital camera used to take high definition video by the user of the mobile device. The front-facing camera 301 can be a medium resolution camera designed to optimize video communication (e.g., video conference call, face-to-face telephone calls, etc.) between multiple devices over a network. As used throughout this disclosure, a network can be any wired or wireless network of devices that are capable of communicating with each other, including but not limited to the cellular networks, the Internet or other Wide Area Networks (WANs), Local Area Networks (LANs), Storage Area Networks (SANs), Intranets, Extranets, and the like.

In accordance with an embodiment, the four corner cameras (304, 305, 306, 307) can be low-resolution cameras designed specifically for user interface controls (e.g. detecting gestures without touching the mobile device, etc.). These cameras can be operating autonomously such that the AP need only be woken up in the event of a particular event being detected. For example, the AP may be awakened upon detecting that the user made a predetermined gesture that would cause the AP to "unlock" the mobile phone, answer an incoming telephone call, or the like.

Figure 4:
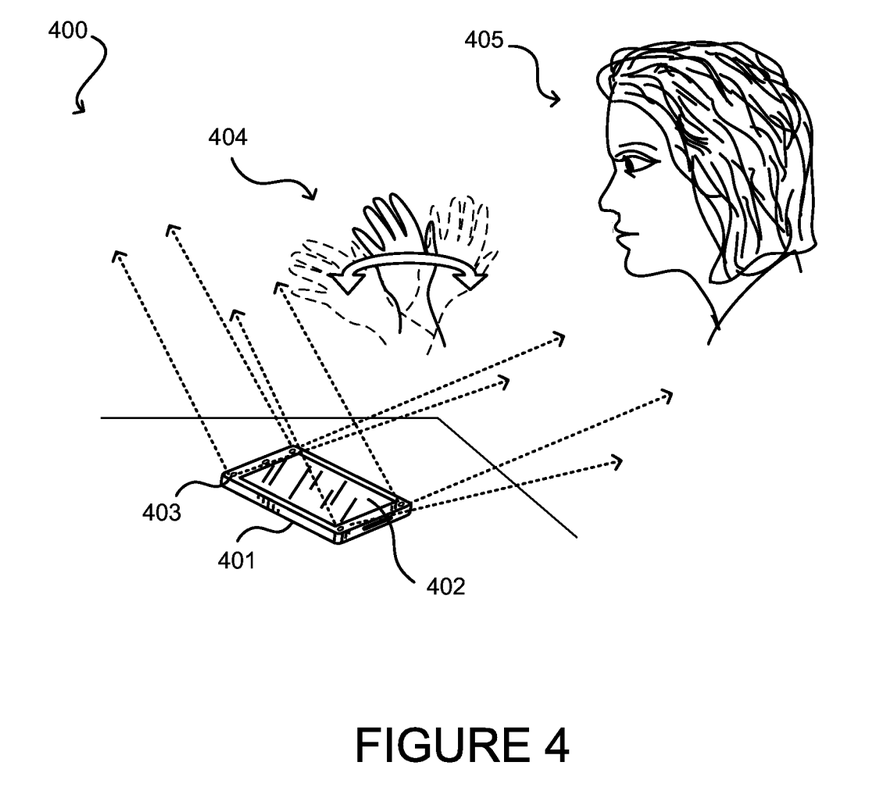
FIG. 4 illustrated an example of the mobile computing device that can be used to process gesture and face tracking information by implementing the dedicated ASIC, in accordance with various embodiments.

FIG. 4 illustrated an example 400 of the mobile computing device that can be used to process gesture and face tracking information by implementing the dedicated ASIC, in accordance with various embodiments. In the illustrated embodiment, the mobile device (e.g., mobile phone) is placed on a surface with the display screen 402 facing up. The device includes a number of front-facing corner cameras 403, as previously described in FIG. 3.

When a user makes a gesture 404 in the view of the four cameras, the cameras can capture the information and provide it to the dedicated ASIC for processing. For example, the four corner cameras 403 may continue capturing the images and the dedicated ASIC can be processing those images to extract the gesture information or the like. When the ASIC detects that a predetermined gesture has been made, it can awaken the AP by sending the high level information over the low-speed interface. The AP can in turn inspect the received information and then decide whether to retrieve the image data from the ASIC for further processing. Similarly, when a user's face moves into the view of one or more of the cameras (e.g., front-facing camera), the ASIC may process the image to perform facial recognition. For example, if the ASIC determines that the face of the user corresponds to the owner, it may invoke the AP to perform some processing (e.g., unlock the phone, etc.).

In this example, any of the cameras, including the four corner cameras and the single front-facing camera can be used to capture the images that will be processed by the ASIC. In other examples, the ASIC can be connected to only a subset of the cameras or other additional cameras, such as the rear-facing camera(s).

Figure 5:
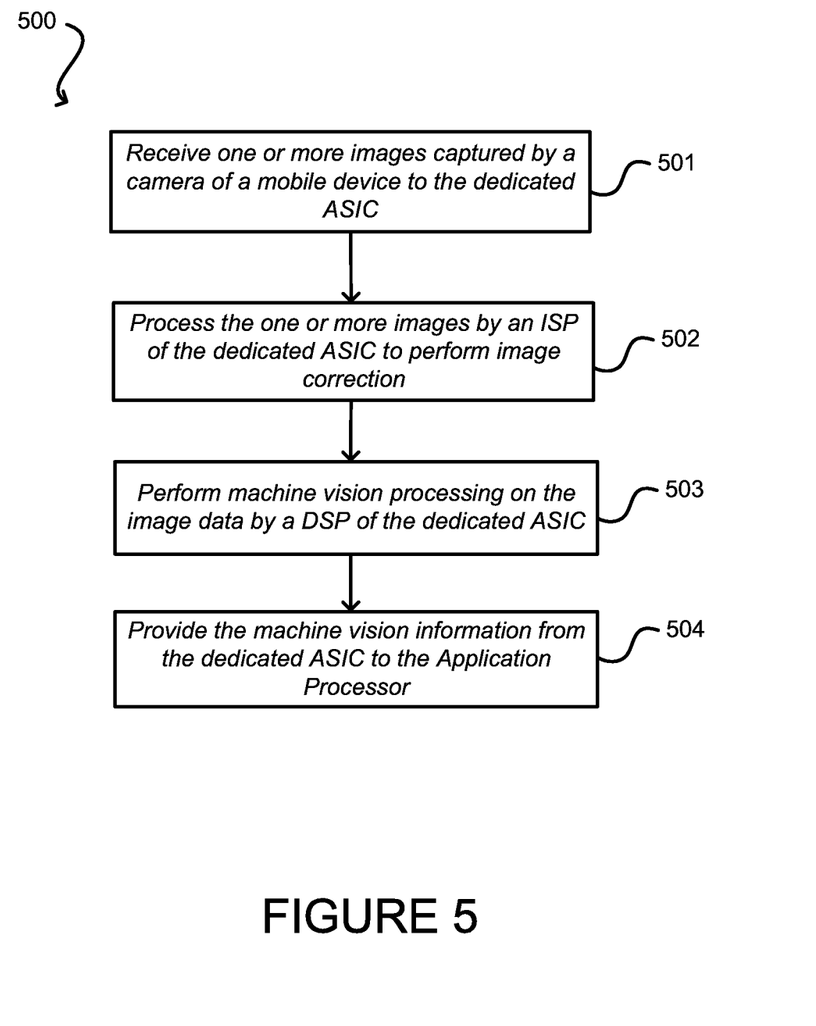
FIG. 5 illustrates an example process that can be performed by the dedicated image processing ASIC, in accordance with various embodiments.

FIG. 5 illustrates an example process 500 that can be performed by the dedicated image processing ASIC, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, the dedicated ASIC receives one or more images captured by a camera (or multiple cameras) of a mobile device. The images can be received over any link appropriate for providing image data, such as the high-speed MIPI bus. In various embodiments, the images can be of any resolution and any format.

In operation 502, an ISP in the dedicated ASIC processes the images to perform at least some image correction on those images. For example, the ISP can perform lens correction, geometric correction, dead pixel correction, data compression, and the like. The ISP can also perform de-mosaicing in the event that the cameras support the red-green-blue (RGB) color model.

In operation 503, an MP/DSP of the dedicated ASIC performs machine vision processing on the image data. In some embodiments, this higher level computations and processing may be performed on the corrected image data that has been produced by the ISP. In other embodiments, the DSP can obtain access to the original "raw" image data being received from the cameras to the combiner. As previously described, the machine vision processing can include extracting any information used to control a process or interface, such as gesture or object tracking, face recognition, stereo image processing and the like.

In operation 504, the MP/DSP of the dedicated ASIC provides the machine vision information to the application processor of the mobile computing device. In accordance with an embodiment, the information is provided over a low-speed and low-power interface, such as the $I^2C$ bus.

Figure 6:
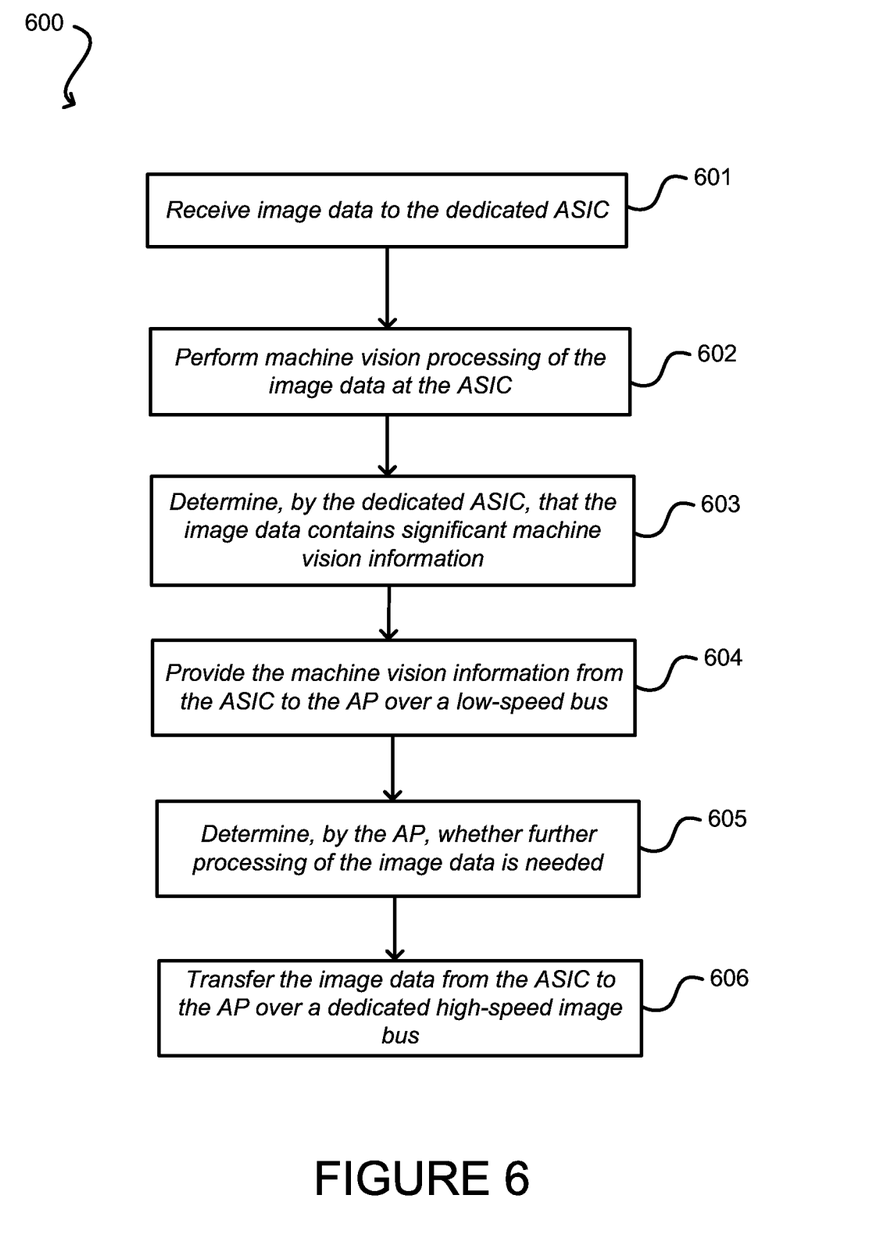
FIG. 6 illustrates an example process of communication between the dedicated image processing ASIC and the application processor of the mobile device, in accordance with various embodiments.

FIG. 6 illustrates an example process 600 of communication between the dedicated image processing ASIC and the application processor of the mobile device, in accordance with various embodiments.

In operation 601, the dedicated ASIC receives image data from one or more cameras of the mobile device. For example, the images may be received from low resolution user-interface cameras integrated in the device. In operation 602, the ASIC performs machine vision processing on the image data. In operation 603, the DSP of the dedicated ASIC determines that the image data contains some predetermined machine vision information. For example, the DSP may analyze a sequence of images, determine that a gesture was made by the user and/or identify the particular gesture.

In operation 604, the DSP provides the machine vision information to the application processor over a low-speed bus. For example, the DSP may first awaken the AP from sleep mode and send one or more packets of data indicating the particular gesture that was detected. In operation 605, the AP inspects the received machine vision information and determines whether further processing is needed. For example, the AP may determine that it needs more detailed information from the image stream based on a particular application installed on the mobile device. If the AP determines that such processing is necessary, it causes the image data to be transferred from the dedicated ASIC to the AP, as shown in operation 606. In one embodiment, the transfer is performed by turning on the high speed dedicated image bus (e.g., MIPI bus) between the ISP and the AP. In other embodiments, the data may be transferred over other interfaces, such as SPI or $I^2C$.

Figure 7:
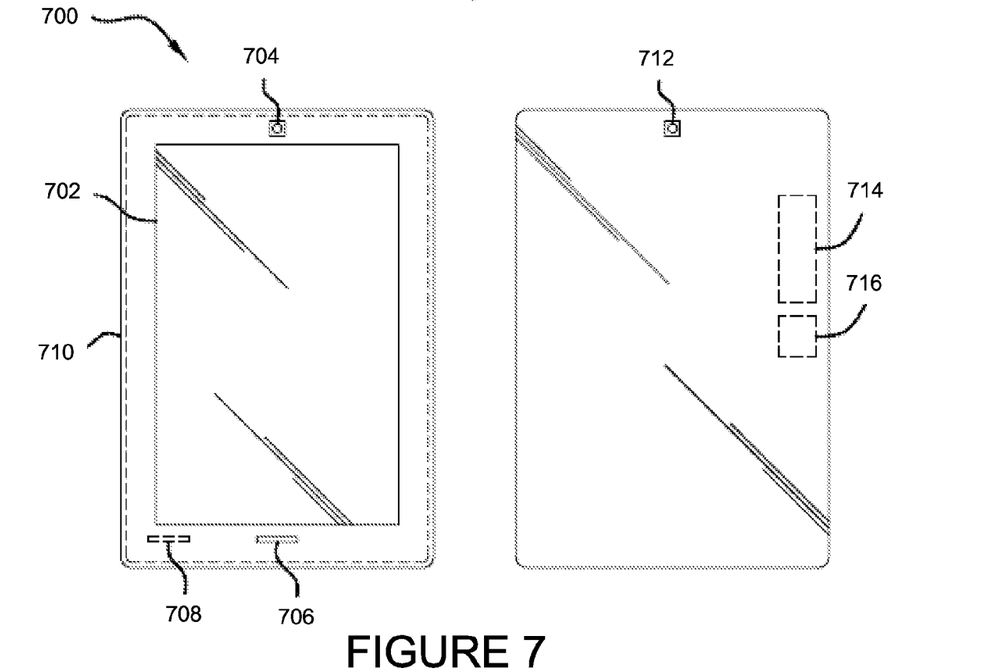
FIG. 7 illustrates front and back views of an example portable computing device that can be used in accordance with various embodiments.

FIG. 7 illustrates front and back views of an example portable computing device 700 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others.

In this example, the portable computing device 700 has a display screen 702 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 710 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 704 on the "front" of the device and one image capture element 712 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 706 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 700 in this example also includes at least one motion or position determining element 708 operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 714, such as may include at least one wired or wireless component operable to communicate with one or more portable computing devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
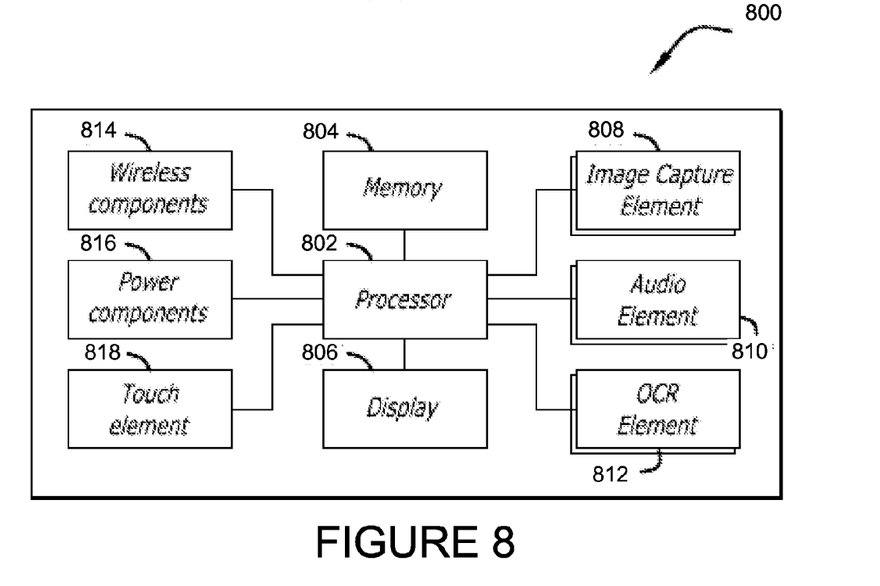
FIG. 8 illustrates an example set of basic components of a portable computing device, such as the device described with respect to FIG. 7.

In order to provide functionality such as that described with respect to FIG. 7, FIG. 8 illustrates an example set of basic components of a portable computing device 800, such as the device 700 described with respect to FIG. 7. In this example, the device includes at least one processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc.

The device typically will include some type of display element 806, such as a touch screen, electronic ink (e-ink), organic light emitting diode (DEED) or liquid crystal display (LCD), although devices such as portable media players might convey information via other means, such as through audio speakers. As discussed, the device in many embodiments will include at least one image capture element 808, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine the surroundings of the device, as discussed herein. An image capture element can include any appropriate technology, such as a CCD image capture element having a sufficient resolution, focal range and viewable area, to capture an image of the user when the user is operating the device.

The device, in many embodiments, will include at least one audio element 810, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one optical character recognizer (OCR) element(s) 812 and various image prepossessing algorithms associated therewith.

The device can include at least one additional input device that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 814 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 816 known in the art for providing power to a portable computing device, which can include capacitive charging elements for use with a power pad or similar device as discussed elsewhere herein. The example device also can include at least one touch and/or pressure sensitive element 818, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
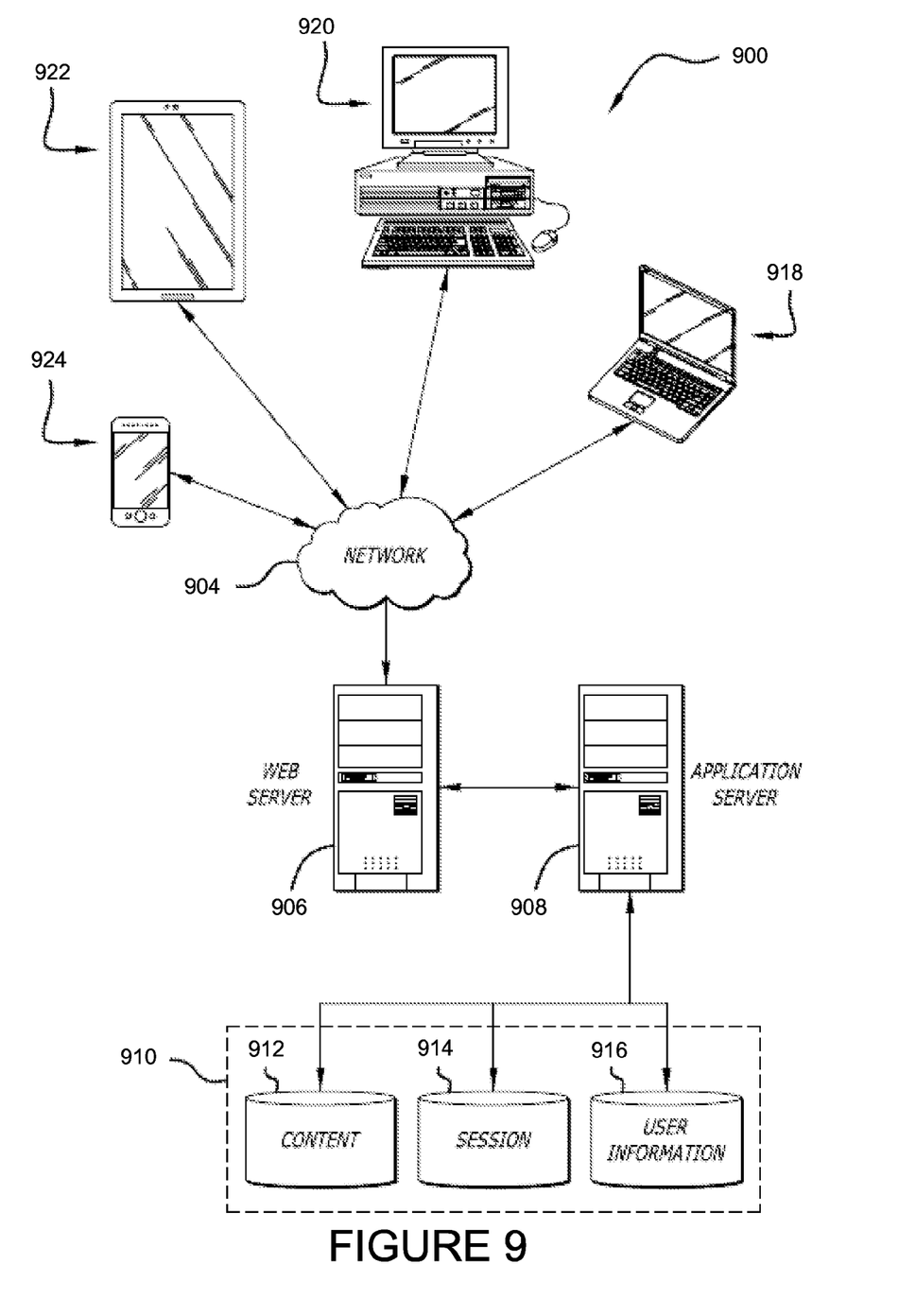
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device (918, 920, 922, 924), which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device (918, 920, 922, 924) and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device (918, 920, 922, 924). Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests, from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computing device, comprising:
an application processor;
a plurality of cameras each configured to capture one or more images;
an application-specific integrated circuit (ASIC) to which at least a portion of image signal processing is offloaded from the application processor, the ASIC including:
a combiner capable of receiving the one or more images from the plurality of cameras, the combiner providing an output signal containing image data;
an image signal processor (ISP) configured to perform image correction on the image data contained in the output signal of the combiner, the ISP connected to a dedicated image bus configured to provide the image data to the application processor; and
a digital signal processor (DSP) configured to analyze the image data to determine machine vision information, the machine vision information associated with at least one of gesture tracking, head tracking, face tracking, object tracking, object recognition, or stereo processing of the one or more images, the DSP connected to a low speed bus that provides the machine vision information from the DSP to the application processor at a lower data rate than the dedicated image bus between the ISP and the application processor.

2. The computing device of claim 1, wherein the low speed bus that provides the machine vision information to the application processor includes a serial data bus connected between the DSP and the application processor.

3. The computing device of claim 1, wherein upon receiving the machine vision information from the DSP over the interface, the application processor:
determines that further processing should be performed based at least in part on the received machine vision information, and
initiates transfer of the image data or additional image data from the dedicated ASIC over the dedicated image bus.

4. An integrated circuit, comprising:
a first processor operable to be connected to at least one camera, the first processor configured to receive one or more images from the at least one camera and perform image correction on the one or more images to produce image data, the first processor connected to a dedicated image bus configured to provide the image data to at least one application processor of a computing device; and a second processor configured to receive the image data from the first processor, perform machine vision processing of the image data to generate machine vision information, and determine whether to send the machine vision information to the at least one application processor over an interface.

5. The integrated circuit of claim 4, wherein the first processor is an image signal processor (ISP) that performs one or more of:
dead pixel correction, lens correction, geometric correction, data compression, generating a histogram of pixel information, automatic exposure control, automatic gain control, automatic white balance, de-mosaicing, edge enhancement, blob identification, image thresholding, image smoothing or image binarization.

6. The integrated circuit of claim 4, wherein the second processor is a digital signal processor (DSP) that performs one or more of:
gesture detection, object tracking, object recognition, stereo processing of two or more images, three dimensional (3D) image capture, image metadata tagging, time-stamping, geographical tagging, or symbol reading.

7. The integrated circuit of claim 4, further comprising:
a combiner that receives images from a plurality of cameras, wherein the second processor is capable of processing the image data from the plurality of cameras while retaining source information associated with each image, the source information identifying a camera of the plurality of cameras that was used to capture the image.

8. The integrated circuit of claim 4, further comprising:
a memory coupled to the second processor, the memory capable of storing the image data captured by the at least one camera.

9. A computer implemented method, comprising:
receiving one or more images captured by a camera to an image signal processor (ISP) the ISP connected to a dedicated image bus configured to provide the image data to an application processor of a computing device;
processing the one or more images by the ISP to perform image correction on the one or more images;
performing machine vision processing on the image data by a digital signal processor (DSP) to determine machine vision information, the DSP configured to determine whether to send the machine vision information to the application processor; and
providing the machine vision information from the DSP to the application processor over an interface.

10. The computer implemented method of claim 9, wherein the image correction performed by the ISP includes one or more of:
dead pixel correction, lens correction, geometric correction, data compression, generating a histogram of pixel information, automatic exposure control, automatic gain control, automatic white balance, de-mosaicing, edge enhancement, blob identification, image thresholding, image smoothing or image binarization.

11. The computer implemented method of claim 9, wherein the machine image processing further includes performing one or more of:
gesture detection, object tracking, object recognition, stereo processing of two or more images, three dimensional (3D) image capture, image metadata tagging, time-stamping, geographical tagging, or symbol reading.

12. The computer implemented method of claim 9, wherein receiving the one or more images further includes:
receiving the one or more images by a combiner from two or more cameras; and
providing the one or more images from the combiner to the ISP.

13. The computer implemented method of claim 9, wherein at least a portion of the machine vision processing is offloaded from the application processor to the DSP, thereby at least partly reducing power consumption of the application processor.

14. The computer implemented method of claim 9, wherein receiving one or more images further includes:
storing the machine vision information into a memory of an application-specific integrated circuit (ASIC).

15. The computer implemented method of claim 9, further comprising:
receiving, by the application processor, the machine vision information from the DSP;
determining, by the application processor, that additional processing on the image data is needed based at least in part on the received machine vision information, and
transferring the image data from the ISP over an image dedicated bus to the application processor.

16. A system, comprising:
an application processor;
at least one camera;
a first processor connected to the at least one camera, the first processor configured to receive one or more images from the at least one camera and perform image correction on the one or more images to produce image data;
a dedicated image bus connecting the first processor to the application processor;
a second processor configured to receive the image data from the first processor, perform machine vision processing of the image data to generate machine vision information, and determine that the machine vision information is to be transmitted to the application processor; and
a serial data bus connecting the second processor to the application processor, wherein the second processor is configured to transmit the machine vision information to the application processor over the serial data bus at a lower data rate than the dedicated image bus connecting the first processor and the application processor.

17. The system of claim 16, wherein the first processor is an image signal processor (ISP) that performs one or more of:
dead pixel correction, lens correction, geometric correction, data compression, generating a histogram of pixel information, automatic exposure control, automatic gain control, automatic white balance, de-mosaicing, edge enhancement, blob identification, image thresholding, image smoothing or image binarization.

18. The system of claim 16, wherein the second processor is a digital signal processor (DSP) that performs one or more of:
gesture detection, object tracking, object recognition, stereo processing of two or more images, three dimensional (3D) image capture, image metadata tagging, time-stamping, geographical tagging, or symbol reading.

19. The system of claim 16, further comprising:
a plurality of cameras; and
a combiner that receives images from the plurality of cameras, wherein the second processor is capable of processing the image data from the plurality of cameras.

20. The system of claim 16, wherein the application processor:

determines that further processing should be performed based at least in part on the received machine vision information received over the serial data bus, and
causes a transfer of the image data or additional image data from the first processor over the dedicated image bus.

* * * * *